3,012,045
17α-ALKENYL DERIVATIVES OF 6α-METHYL-17β-HYDROXY-19-NOR-4-ANDROSTEN-3-ONE

Frank B. Colton, Chicago, and Norman W. Atwater, Arlington Heights, Ill., assignors to G. D. Searle & Co., Chicago, Ill., a corporation of Delaware
No Drawing. Filed June 8, 1959, Ser. No. 818,528
Claims priority, application Great Britain Jan. 22, 1959
2 Claims. (Cl. 260—397.4)

The present invention relates to a new group of progesterone-like compounds and more particularly to 17α-alkynyl and 17α-alkenyl derivatives of 6α-methyl-17β-hydroxy-19-nor-4-androsten-3-one of the general structural formula

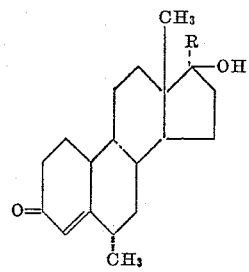

wherein R is a member of the group consisting of lower alkenyl and alkynyl radicals. In the foregoing structural formula the radical R can be an alkenyl radical such as vinyl, allyl, and butenyl or an alkynyl radical such as ethynyl, propynyl, and butynyl.

The compounds of this invention are highly active progesterone-like agents. They thus have the same field of utility as progesterone but have the advantage of a very high order of oral potency. Having a true progesterone-like action, they lack androgenic, anabolic and anti-ovulatory side effects. Histological assays show that they produce the low columnar epithelial cells in the lining of the uterus characteristic for true progesterone-like drugs. They are thus unlike such ovulation-inhibitors as 17α - ethynyl - 17β-hydroxy-19-nor-4-androsten-3-one and androgens, both of which produce a high columnar epithelial cell. A great enhancement in progestational potency over the analogous compounds lacking the 6-methyl group is seen, particularly in the 17α-alkenyl compounds. The compounds of this invention differ from the corresponding 17α-alkyl compounds by their lack of anabolic side reactions.

The compounds of this invention are conveniently prepared by the dehydration of the corresponding saturated 5-hydroxy derivatives, typically with a dilute base such as sodium hydroxide.

The compounds which constitute this invention and the methods for their preparation will appear more fully from the consideration of the following examples, which are given for the purpose of illustration only, and are not to be construed as limiting the invention in spirit or in scope. In these examples, the quantities are given in parts by weight.

The present application is a continuation-in-part of copending application Serial No. 710,858, filed January 24, 1958, which issued as U.S. Patent 2,891,078 on June 16, 1959.

Example 1

To a solution of 130 parts of 3β-methoxy-19-nor-2,5(10)-androstadien-17β-ol in 2200 parts of benzene and 516 parts of ethylene glycol are added 3 parts of p-toluenesulfonic acid monohydrate. The mixture is stirred and refluxed with a water separator in the vapor path for about 24 hours. The mixture is cooled and then 1000 parts of a 5% aqueous solution of sodium bicarbonate are added with stirring. The organic layer is separated, washed with water and then a small portion of ethanol is added. The solution is vacuum distilled to dryness and the residue is recrystallized from a mixture of methanol and water to yield 3-ethylenedioxy-19-nor-5-androsten-17β-ol melting at about 137.5–139° C.

Alternatively, a mixture of 45 parts of 17β-hydroxy-19-nor-4-androsten-3-one, 1190 parts of benzene, 500 parts of ethylene glycol and 1.35 parts of p-toluenesulfonic acid is treated in the same manner as in the foregoing paragraph of this example to yield the same 3-ethylenedioxy-19-nor-5-androsten-17β-ol.

Example 2

A solution of 31 parts of 3-ethylenedioxy-19-nor-5(6)-androsten-17β-ol in 294 parts of pyridine and 162 parts of acetic anhydride is allowed to stand at room temperature for about 15 hours. The solution is then diluted with 2000 parts of water and the solid is collected by filtration and washed with water. Upon recrystallization from a mixture of acetone and water, and then from diisopropyl ether there is obtained 3-ethylenedioxy-17β-acetoxy-19-nor-5(6)-androstene melting at about 173–175.5° C.

Example 3

To the slurry obtained by the addition of 0.9 part of anhydrous sodium acetate to a solution of 3.65 parts of 3-ethylenedioxy-17β-acetoxy-19-nor-5(6)-androstene in 45 parts of benzene are added with stirring 39.7 parts of a 0.28 M solution of peroxybenzoic acid in benzene. The mixture is protected from atmospheric moisture and stirred for 4 hours at room temperature. The mixture is washed with a 2% aqueous solution of sodium carbonate until the washings are basic and then with water. The resulting benzene solution is evaporated to dryness under vacuum. The residue is recrystallized from diisopropyl ether to yield 3-ethylenedioxy-5α,6α-epoxy-17β-acetoxy-19-norandrostane melting at about 170–171° C.

Example 4

To a solution of 0.8 part of 3-ethylenedioxy-5α,6α-epoxy-17β-acetoxy-19-norandrostane in 110 parts of tetrahydrofuran are added 17 parts of a 3 molar solution of methylmagnesium bromide in ethyl ether. The solvent is distilled from the reaction mixture until the temperature reaches 60° C., whereupon the mixture is refluxed for 24 hours while it is protected from atmospheric moisture. The excess Grignard reagent is decomposed by the addition of water, and the mixture is extracted with ether. The ethereal solution is washed with water, dried over anhydrous sodium sulfate, filtered, and evaporated to dryness. The residue is recrystallized from diisopropyl ether to yield 6β-methyl-3-ethylenedioxy-19-norandrostane-5α,17β-diol showing a double melting point at 111–112.5° C. and 140° C.

Example 5

To a solution of 0.20 part of 6β-methyl-3-ethylenedioxy-19-norandrostane-5α,17β-diol in 8.6 parts of toluene and 1.9 parts of cyclohexanone is added a solution of 0.14 part of aluminum isopropoxide in 3.4 parts of toluene. The mixture is refluxed for about 30 minutes and then 2 parts of a saturated aqueous solution of potassium sodium tartrate are added. The solvents are removed by steam distillation. The product is collected on a filter and upon recrystallization from diisopropyl ether, there is obtained pure 6β - methyl - 3 - ethylenedioxy-5α-hydroxy-19-norandrostan-17-one melting at about 163–165° C.

Example 6

A Grignard reagent is prepared by reacting 78 parts of 2-methallyl chloride with 42 parts of magnesium turnings in 1200 parts of diethyl ether. To a solution of 2 parts of 6β-methyl-3-ethylenedioxy-5α-hydroxy-9-norandrostan-17-one in 127 parts of tetrahydrofuran are added 100 parts of the slurry of 2-methallylmagnesium chloride in diethyl ether. The solvent is distilled from the reaction mixture until the temperature reaches 55° C., and then the solution is refluxed for 16 hours. The excess Grignard reagent is decomposed by the slow addition of water and the solution is extracted with ether. The ether extract is washed with saturated aqueous sodium chloride solution and then an equal volume of benzene is added. The solvents are removed under reduced pressure and the residue is recrystallized from diisopropyl ether to yield 3-ethylenedioxy - 6β - methyl - 17α - (2 - methallyl) - 19-norandrostane-5α,17β-diol. The product may be obtained either as prisms upon the slow cooling of the diisopropyl ether solution or as slender needles by the rapid cooling of a supersaturated diisopropyl ether solution. The prisms show a melting point of about 153–154° C. and the needles show a melting point of about 167–167.5° C.

Substitution of a Grignard reagent obtained by reacting 9.8 parts of allyl chloride with 6.3 parts of magnesium turnings in 180 parts of diethyl ether for the Grignard reagent obtained by reacting 2-methallyl chloride with magnesium turnings in the procedure of the first paragraph of this example yields 3-ethylenedioxy-6β-methyl-17α-allyl-19-norandrostane-5α,17β-diol melting at about 160.5–164° C.

*Example 7*

A solution of 0.47 part of 3-ethylenedioxy-6β-methyl-17α - (2 - methallyl)-19-norandrostane-5α,17β-diol in 18 parts of glacial acetic acid and 4.5 parts of water is heated for about 15 minutes on a steam bath and then diluted to a volume of about 150 parts with water. The solid is collected by filtration and upon recrystallization from a mixture of acetone and water and then from diisopropyl ether there is obtained 5α,17β-dihydroxy-6β-methyl-17α-(2-methallyl)-19-norandrostan-3-one melting at about 174–175.5° C.

Substitution of an equimolar amount of 3-ethylenedioxy-6β-methyl-17α-allyl-19-norandrostane - 5α,17β - diol for the 3-ethylenedioxy-6β-methyl-17α-(2-methallyl)-19-norandrostane-5α,17β-diol in the preceding paragraph of this example yields 5α,17β-dihydroxy-6β-methyl-17α-allyl-19-norandrostan-3-one melting at about 191–193° C.

*Example 8*

A solution of 0.38 part of 5α,17β-dihydroxy-6β-methyl-17α-(2-methallyl)-19-norandrostan-3-one in 16 parts of ethanol and 4 parts of 0.1 N sodium hydroxide solution is refluxed under a nitrogen atmosphere for about 4 hours. The solution is then diluted with water to incipient crystallization and after cooling, the compound is collected by filtration. In this manner there is obtained 6α-methyl - 17β - hydroxy - 17α - (2 - methallyl) - 19 - nor-4-androsten-3-one. The compound shows absorption in the ultraviolet at 241 millimicrons with an extinction coefficient of about 15,800. It has infrared absorption bands at 2.78, 3.28, 6.01, 6.20, and 11.17 microns.

Substitution of an equimolar amount of 5α,17β-dihydroxy-6β-methyl-17α-allyl-19-norandrostan-3-one for the 5α,17β - dihydroxy - 6β - methyl - 17α - (2 - methallyl)-19-norandrostan-3-one in the preceding paragraph of this example yields 6α-methyl-17β-hydroxy-17α-allyl-19-nor-4-androsten-3-one. The compound shows absorption in the ultraviolet at 241 millimicrons with a molecular extinction coefficient of 16,100. It has absorption bands in the infrared at 2.80, 3.27, 6.00, 6.20, and 11.30 microns.

*Example 9*

A mixture of 9 parts of finely divided potassium hydroxide in 50 parts of dimethyl ether of diethylene glycol and 2.5 parts of the monoethyl ether of diethylene glycol is cooled to —5° C. and then saturated with acetylene gas. To this mixture is added a solution of 1.5 parts of 3 - ethylenedioxy-5α-hydroxy-6β-methyl-19-norandrostan-17-one in 10 parts of dimethyl ether of diethylene glycol. The reaction mixture is stirred at —5° C. and acetylene gas is passed through the solution for an additional 90 minutes. Then about 400 parts of water are added and the product is collected by filtration. Upon recrystallization from aqueous methanol there is obtained 6β-methyl-3 - ethylenedioxy - 17α - ethynyl - 19 - norandrostane-5α,17β-diol melting at about 183–184° C.

Substitution of an equimolar amount of 6β-methyl-3-ethylenedioxy - 17α - ethynyl - 19 - norandrostane - 5α, 17β-diol for the 3-ethylenedioxy-6β-methyl-17α-(2-methallyl)-19-norandrostane-5α,17β-diol used in the first paragraph of Example 7 yields 5α,17β-dihydroxy-6β-methyl-17α-ethynyl-19-norandrostan-3-one melting at about 208–211° C.

A solution of 0.4 part of 5α,17β-dihydroxy-6β-methyl-17α-ethynyl-19-norandrostan-3-one in 16 parts of ethanol and 4 parts of 0.1 N sodium hydroxide solution is refluxed under a nitrogen atmosphere for about 4 hours. The solution is then diluted with water to incipient crystallization and after cooling, the compound is collected by filtration. In this manner there is obtained 6α-methyl-17β-hydroxy-17α-ethynyl-19-nor-4-androsten-3-one. The compound shows absorption in the untraviolet at 241 millimicrons with an extinction coefficient of about 16,200.

*Example 10*

A solution of 7.4 parts of 3-ethylenedioxy-6β-methyl-17α-ethynyl-19-norandrostane-5α,17β-diol in 85 parts of tetrahydrofuran is refluxed for 5 hours with 25 parts of a solution of ethylmagnesium bromide in ether. Then 14.2 parts of methyl iodide are added and the solution is refluxed for 6 hours. The solution is allowed to stand for 15 hours at room temperature and then the excess Grignard reagent is destroyed by the slow addition of about 300 parts of water. The aqueous layer is separated and extracted with ethyl acetate. The organic extracts are combined, washed with saturated sodium chloride solution and vacuum distilled to dryness.

This residue, 3-ethylenedioxy-6β-methyl-17α-(1-propynyl)-19-norandrostane-5α,17β-diol, is taken up in 40 parts of methanol and 2 parts of concentrated hydrochloric acid in 5 parts of water are added. The solution is allowed to stand at room temperature for 6 hours and then 300 parts of water are added. The mixture is extracted with ether; the extract is washed with a 5% aqueous sodium bicarbonate solution and water and then dried over sodium sulfate. The solvent is removed by vacuum distillation and the residue is taken up in benzene and applied to a chromatography column containing silica gel. The column is developed with benzene and benzene solutions containing an increasing amount of ethyl acetate. Upon elution with a 5% solution of ethyl acetate in benzene and recrystallization from diisopropyl ether there is obtained 6α-methyl-17-hydroxy-17α-(1-propynyl)-19-nor-4-androsten-3-one. The product shows absorption in the ultraviolet at 241 millimicrons with an extinction coefficient of 16,000. Absorption bands in the infrared are observed at 2.80, 6.00 and 6.18 microns. This compound can also be prepared by the procedure of Example 9.

*Example 11*

Substitution of an equimolar amount of ethyl iodide for methyl iodide in the procedure of Example 10 and recrystallization of the final product from aqueous methanol yields 6α-methyl-17-hydroxy-17α-(butynyl)-19-nor-4-androsten-3-one. The compound shows absorption in the ultraviolet at 240 millimicrons with an extinction coefficient of about 15,700. Absorption bands are observed in the infrared at 2.77, 5.99 and 6.20 microns. This compound can also be prepared by the procedure of Example 9.

What is claimed is:
1. A compound of the formula
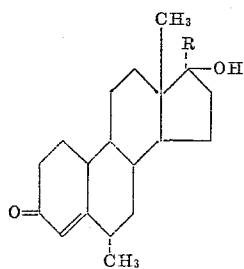
wherein R is an alkenyl radical of less than 5 carbon atoms.
2. 6α-methyl - 17α-methallyl - 17β - hydroxy-19 - nor-4-androsten-3-one.
References Cited in the file of this patent
UNITED STATES PATENTS
| | | |
|---|---|---|
| 2,704,768 | Colton | Mar. 22, 1955 |
| 2,721,871 | Colton | Oct. 25, 1955 |
| 2,744,122 | Djerassi et al. | May 1, 1956 |
| 2,838,530 | Colton | June 10, 1958 |
| 2,891,078 | Colton et al. | June 16, 1959 |
OTHER REFERENCES
Hartley et al.: J. Pharm. & Pharmacol., pages 929–34, December 1957.